Patented Aug. 6, 1935

2,010,076

UNITED STATES PATENT OFFICE 2,010,076

PROCESS FOR THE TREATMENT OF UNSATURATED ALCOHOLS

Herbert Peter Augustus Groll and Miroslav W. Tamele, Berkeley, Calif., assignors to Shell Development Company, San Francisco, Calif., a corporation of Delaware No Drawing. Application November 4, 1932, Serial No. 641,230

22 Claims. (Cl. 260—138)

Our invention relates to the production of saturated oxy compounds from unsaturated hydroxy compounds, and more particularly is concerned with the molecular rearrangement of the latter whereby the saturated isomers are obtained.

The unsaturated hydroxy compounds such as unsaturated alcohols, glycols, chlorohydrines, etc. to which our method is applicable may be represented by the following formula

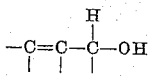

wherein the loose bonds may be taken up by hydrogen, halogen, alkyl, alkoxy, aryl, aryloxyl, aralkyl or aralkoxy radical which groups may or may not be further substituted. Allyl alcohol is the simplest member of this group. We found that this alcohol can be rearranged, according to our method, to propionaldehyde. This rearrangement proceeds, however, rather slowly even at the conditions which constitute our invention. Similarly, crotyl alcohol and other higher homologues of allyl alcohol offer the same difficulties. Another group of compounds is represented by the following formula

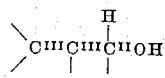

wherein at least one of the two carbon atoms $C^{III}$ is a tertiary one, i. e. it is linked to three other carbon atoms. The carbon atom $C^{II}$ may be either of primary or secondary nature. This second group of unsaturated hydroxy compounds is much more adapted to the arrangement reaction.

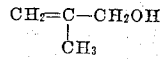

is the simplest member of this series which becomes more complex as we deal with compounds containing a large number of carbon atoms to the molecule:

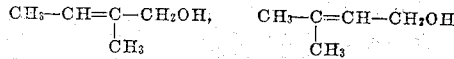

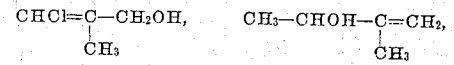

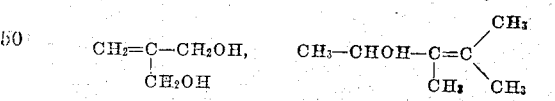

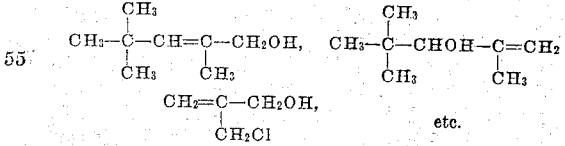

etc.

When both loose bonds on the carbon atom which is linked to the hydroxy group which is to be rearranged are taken up by hydrogen, the alcohol is of primary character and may be regarded as a mono-olefine substituted carbinol. Alcohols of this type form saturated aldehydes, aldols or halogenated aldehydes by molecular rearrangement. When one of the loose bonds attached to the carbon atom which is linked to the said hydroxy group is taken up by an alkyl, alkoxy, aryl, aryloxy, aralkyl or aralkoxy radical which may be further substituted, the alcohol is of secondary character; and the product of molecular rearrangement is a saturated ketone, ketol, halogenated ketone, etc. Where halogen or a hydroxy group is in gamma position with respect to the carbinol group, three examples of which are listed above, the compounds are unstable after rearrangement and readily split off water or hydrogen halide from the molecule with the formation of unsaturated aldehydes or ketones.

In the subsequent specification, the two types of unsaturated hydroxy compounds are denoted by the expression "olefine alcohol" and their respective saturated isomers are understood to be aldehydes or ketones, according to the foregoing.

When the rearrangement is carried out in the customary way, by treatment with aqueous sulfuric acid at elevated temperatures, a number of secondary and side reactions occur, resulting in the production of a considerable quantity of polymers and other undesirable products which reduce the yield of the desirable isomer and contaminate the same.

In general, neither the olefine alcohols, nor the isomeric aldehydes or ketones, formed from them by molecular rearrangement, are soluble in water or in aqueous sulfuric acid in all proportions. In consequence of this, the liquid in the autoclave, or other similar reaction vessel usually employed for this purpose, is present in two phases. Without thorough agitation, these two liquid phases form distinct layers. The nonaqueous one of these contains alcohol, isomer and products soluble in them, including some water. The aqueous layer consists of a solution in the aqueous acid of alcohol, isomer and other compounds according to their solubilities. With more or less violent agitation, the two layers can be made to disappear and an emulsion may be formed in which, however, both liquid phases are still present.

We have found that the rearrangement of the olefine alcohols proceeds substantially only in the aqueous acid phase, and there, given the right conditions, can be made to proceed smoothly and without substantial formation of undesirable byproducts. Contrary to this, in the alcoholic phase, polymerization and other side reactions, between alcohol and isomer predominate and result in the destruction of some of the aldehyde or ketone already formed or of some of the unreacted alcohol or both. Mere agitation or emulsification of the two phases does not avoid the side reactions.

To avoid this, we carry out the reaction under such conditions which preclude the formation of the non-aqueous liquid phase containing principally the alcohol and its isomer. To accomplish this, we charge into the reaction vessel the required quantity of aqueous acid, together with about as much of the alcohol as can enter into a homogeneous solution with the aqueous acid at the reaction temperature.

As the reaction proceeds and isomer is being formed, the solution soon becomes saturated with the isomer, the latter being less soluble in water than the alcohol. As soon as this condition is attained, any further aldehyde or ketone formed would appear as a second phase and we prefer to prevent this in one of two ways. By the first method, which is applicable to compounds which volatilize easily at the conditions of our method, we make use of the fact that the boiling temperature of the alcohol (or its constant boiling mixture with water) is higher than that of the isomer (or its constant boiling mixture with water). By keeping the pressure in the reaction vessel below the vapor pressure of the isomer at the reaction temperature, we can cause any aldehyde or ketone to evaporate substantially as soon as it separates as a second liquid phase from the solution saturated with it. Or, by further lowering the pressure in the reaction vessel, we may cause part of the isomer in the homogeneous solution to evaporate and in this way prevent any tendency for its accumulation in the solution.

The isomer may be recovered by condensing the vapors removed from the reaction vessel. This condensate would naturally contain quantities of unreacted alcohol and water and the isomer can be separated from these by fractional distillation.

In practice it may be preferable to arrange the fractionating apparatus adjacent to the reaction vessel. In this case, the vapors from the latter are conducted into the fractionating column at a suitable point. Isomer, or isomer and water, e. g. in proportions of a constant boiling mixture, is fed to the top of the column as reflux, aqueous isomer being recovered as the distillate and aqueous alcohol as the residue.

The distillate of aqueous isomer, upon cooling, say to about room temperature or lower, usually separates into two layers, one of which is nearly water-free isomer, the other one mostly water. The isomer may be further dehydrated by salting and/or redistillation, if desired. For example, if we desire to avoid salting, we proceed as follows: the overhead distillate is separated into two layers and the isomer-layer is returned to the fractionating apparatus as reflux. The aqueous layer can either be redistilled separately or united with the material in the rearrangement still. When the condensed distillate begins to become homogeneous, it is collected separately as intermediate cut until the distilling temperature has risen to that of the pure isomer. At this moment, if the process is being carried out as a batch operation, the distillation is interrupted and the kettle of the fractionating apparatus drained. The product is anhydrous aldehyde or ketone. The intermediate cut can be united with the charge for the next batch.

In continuous operation the concentration of alcohol in the reaction vessel is kept up by feeding alcohol to it at approximately the same rate at which it is consumed by rearrangement or removed by distillation. The alcohol is preferably introduced near the bottom of the rearrangement kettle and a porous disc or a perforated tube may be used for this introduction. Rapid agitation of the liquid is of course of advantage because it causes the alcohol to dissolve rapidly in the dilute acid. Part of the aforementioned feed may be the residue from the fractionating apparatus, containing the unchanged alcohol removed from the reaction vessel with the aldehyde or ketone vapors.

By the second method, we utilize the decreased solubility of the alcohol and of its isomer at lower temperatures. When rearrangement has progressed to a point where, at the reaction temperature, the concentration of the isomer in the liquid phase has practically reached saturation, we remove the liquid from the reaction vessel and, by cooling it, cause a portion of the isomer formed to separate and collect as a distinct liquid layer from the aqueous solution. In certain cases, e. g. when treating a polyhydroxy olefine, the resulting hydroxy aldehyde (aldol) or ketol may be considerably soluble in water. In such case, we prefer to extract the product from the reaction mixture by means of suitable solvents. The collected layer or the extract we remove, and from it, preferably by distillation obtain the isomer in the desired purity. Unchanged alcohol contained in the mixture is recovered and returned to the reaction vessel.

Suitable arrangement of heat exchanging devices for cooling the saturated liquid before entering the separator and utilizing its heat content for heating the lean liquid being returned to the reaction vessel, may be provided.

By both methods of operation, our process may be carried out continuously, intermittently or batch as will be apparent to those versed in the art. The main requirement for its successful operation is the maintenance of a substantially homogeneous liquid phase in the reaction vessel, by restricting the excessive accumulation in it of partially soluble liquids Although it is advantageous to use a homogeneous system which will give the maximum yield, at times it will be extremely difficult to maintain the system strictly homogeneous. By working under superatmospheric pressure and restorting to high temperatures, excellent yields can still be obtained as the rate of the rearrangement reaction is increased so much that there is less time for polymerization.

As catalyst, we may use acid catalysts as phosphoric acid, sulfuric acid, hydrochloric acid, perchloric acid, benzene sulfonic acid and its homologues, acid salts of the above polybasic acids such as the alkali-metal and ammonium salts, acid alkyl esters, etc. The weaker the acid is, the lower is its catalytic power. In other words, the rate of rearrangement is proportional to the strength of the catalyst and to the temperature. Accordingly, with other things equal, the employment of a weaker acid requires its application in higher concentrations in order to obtain the same degree of activity. Thus 40% to 50% phosphoric acid is about as active as sulfuric acid of 10% strength.

In using aqueous sulfuric acid, we prefer it to be of less than 20% $H_2SO_4$ content, the preferred concentration being between 10% and 15%. With over 20% $H_2SO_4$ heavy polymerization losses were found to occur.

While the rearrangement can be achieved by boiling the reaction mixture at its boiling temperature at atmospheric pressure, the optimum temperature for the rearrangement was found to be above said boiling temperature, varying with the character of the alcohol, its concentration, its purity, the number of carbon atoms to the molecule, etc. To maintain the higher temperature, a pressure above atmospheric must be applied. A somewhat less practical method is to keep the reaction mixture at the higher temperature under atmospheric pressure and introduce the alcohol near the bottom of the rearrangement vessel. The time of contact is somewhat short when an alcohol of comparatively low boiling point is applied on account of rapid evaporation of both isomer (aldehyde or ketone) and alcohol.

The olefine alcohol may be introduced containing varying amounts of water. Its constant boiling mixture with water may be used as well as the substantially anhydrous alcohol.

The acid catalyst may be mixed with the alcohol before, during, or after the introduction of the latter into the rearrangement vessel.

Example I

For purposes of illustration only, reference will be had to the conversion of isobutenol

to isobutyraldehyde

Into a reaction vessel constructed of or lined with material to resist the action of dilute sulfuric acid, such as lead, of sufficient strength to withstand an internal working pressure of about 25 to 30 lbs. per sq. in. gauge and provided with a mechanical stirring device, means for heating and the necessary inlet and outlet connections, we charge a quantity of $H_2SO_4$ of about 10 to 13% strength. This we heat to a temperature between about 90° C. and 120° C., preferably above 105° C. and, under agitation, slowly introduce isobutenol. The rate of alcohol feed is adjusted to be about equal to that of the rearrangement which, at the temperatures indicated, will be from 300 to 500 c. c. per hour for each liter of aqueous acid present in the reactor.

A vapor line leads from the vapor space of the reaction vessel to an intermediate section of a fractionating column of a conventional type. This column is provided with a condenser at its upper end and may also have a reboiler fitted at its bottom.

Isobutyraldehyde forms a constant boiling mixture of 60.4° C. boiling temperature at normal atmospheric pressure, with 5% water. As soon as the formation of aldehyde begins, its vapors enter the column (accompanied by alcohol vapors and steam). They undergo fractionation and, if the distillation were carried out at substantially atmospheric pressure, vapors of the composition just described would leave the top of the column.

In order to carry out the reaction in the preferred temperature range, it is necessary to raise the pressure in the reaction vessel to between 5# and 20# per sq. in. gauge. To enable the return of unchanged alcohol, recovered as distillation residue, from the bottom of the fractionator to the reaction system, without the use of a pump, we prefer to operate the fractionator at substantially the reactor pressure. In consequence of this, the composition of the condensate may be slightly altered.

The vapors leaving the top of the column are condensed and part of the condensate run back into the column as reflux. The remainder is cooled to 15° to 20° C., when substantially all water settles out, leaving an upper layer of nearly anhydrous aldehyde, from which the last traces of water may be removed by salting and/or redistillation.

The distillation residue of aqueous alcohol is returned to the reaction vessel and the process is continuous, being limited only by the life of the acid catalyst.

If when using aqueous alcohol, a gradual accumulation of water may take place in the rearrangement kettle acting to dilute the acid catalyst, this can be corrected either by distilling off some water at certain intervals or by running some of the sulfuric acid catalyst to waste and bringing back the concentration by adding fresh concentrated sulfuric acid.

Provisions should be made for occasionally running the acid catalyst into a skimmer tank. In this tank, polymer, accumulating as a top layer, can be separated whereby the formation of a non-aqueous phase in the process, due to the presence of polymer, is substantially avoided.

By operating our process as described, we are able to obtain a 95% conversion of alcohol to isomer with a fresh catalyst, the yield gradually diminishing to about 90% after extended operation. This can be compared very favorably with the prior art wherein a yield of 50% was considered satisfactory.

Example II 5 gallons of 13% aqueous sulphuric acid were placed into a lead-lined kettle to which a fractionating column was attached. The kettle was heated to 114° C. The top layer of the azeotropic mixture of isobutenol and water was steadily passed into the kettle at a rate of 6–7 lbs. per hour. The pressure in the kettle was maintained at 10–12 lbs. per. sq. in. and the contents were stirred rapidly. An azeotropic mixture of aldehyde and water was distilling over, containing around 10–12% of water.

During 12.7 hours, 16.5 gallons of aqueous isobutenol containing 91.5 lbs. of isobutenol were charged and 13.8 gallons of the azeotropic mixture of aldehyde and water distilled out. The condensate contained 86.5 lbs. of isobutyraldehyde which represents a yield of 94.5 mol. per cent. The kettle was then heated to 120–125° C. A small amount of higher boiling yellow oils and water distilled from the kettle.

Example III 5 gallons of 15% aqueous sulphuric acid were heated to 100° C. in the apparatus described in Examples I and II. While the acid was stirred rapidly and the temperature of the charge was kept around 95°–100° C. 43 lbs. of 2-methyl butene-2 ol-4, B.P. 137°–139° C., obtained by hydrolysis of a chlorinated amylene cut of cracked gasoline, was fed to the bottom of the kettle at a rate of 2 lbs. per hour. By regulating the reflux at the top of the fractionating column, a steady distillation of an azeotropic mixture of isovaleraldehyde and water under atmospheric pressure at 85°–90° C. was maintained. The aldehyde formed was dried by fractionation and a total yield of 37.5 lbs. of isovaleraldehyde was recovered.

Example IV 3 liters of 14% sulphuric acid were heated in a corrosion-resisting stirring autoclave to 130° C. 10.5 liters of 2-methyl butene-1 ol-3 were pumped steadily at a rate of 1 liter per hour into the hot agitated acid. The pressure was kept at 53 lbs. per square inch. An azeotropic mixture of methyl isopropyl ketone was distilled from the top of a fractionating column attached to the autoclave. The distillation proceeded at the same rate as the feed to the kettle. Within 11 hours about 12 liters of product were collected wherefrom 8.3 kg. of pure methyl isopropyl ketone were recovered by salting and distillation.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories which we have advanced as to the reasons for the advantageous results attained. On the other hand, the invention is to be regarded as limited only by the terms of the accompanying claims, in which it is our intention to claim all novelty inherent therein as broadly as is possible in view of the prior art.

We claim as our invention:

1. A process for the conversion of an olefine alcohol possessing an olefinic grouping directly linked to a carbinol group containing at least one hydrogen atom into its saturated isomer which comprises heating a substantially homogeneous aqueous liquid system comprising said alcohol and an acid catalyst.

2. A process for the conversion of an olefine alcohol possessing an olefinic grouping directly linked to a carbinol group containing at least one hydrogen atom into its saturated isomer which comprises heating a substantially homogeneous aqueous liquid system comprising said alcohol and an acid catalyst of the class consisting of mineral acids, and their acid salts.

3. A process for the conversion of an olefine alcohol possessing an olefinic grouping directly linked to a carbinol group containing at least one hydrogen atom into its saturated isomer which comprises heating a substantially homogeneous aqueous liquid system comprising said alcohol, said isomer and an acid catalyst.

4. A process for the conversion of an olefine alcohol possessing an olefinic grouping directly linked to a carbinol group containing at least one hydrogen atom into its saturated isomer which comprises heating a substantially homogeneous liquid system comprising said alcohol, said isomer and an acid catalyst and removing from said liquid system the isomer at substantially the rate at which it is formed.

5. A process for the continuous conversion of an olefine alcohol possessing an olefinic grouping directly linked to a carbinol group containing at least one hydrogen atom into its saturated isomer which comprises feeding into a heated solution of an acid catalyst said olefine alcohol and removing from said solution said isomer, the alcohol feed and isomer removal being so adjusted that substantially no second liquid phase appears.

6. A process for the continuous conversion of an olefine alcohol possessing an olefinic grouping directly linked to a carbinol group containing at least one hydrogen atom into its saturated isomer which comprises feeding into a heated solution of an acid catalyst said olefine alcohol, removing from said solution vapors comprising alcohol and said isomer, recovering the alcohol from the vapors and returning it to the solution, the alcohol feed and isomer removal being so adjusted that substantially no second liquid phase appears.

7. A process for the conversion of an olefine alcohol possessing an olefinic grouping directly linked to a carbinol group containing at least one hydrogen atom into its saturated isomer which comprises heating a substantially homogeneous liquid system comprising said alcohol and an acid catalyst at superatmospheric pressure.

8. A process for the conversion of an olefine alcohol possessing an olefinic grouping directly linked to a carbinol group containing at least one hydrogen atom into its saturated isomer which comprises heating a substantially homogeneous aqueous liquid system comprising said alcohol, said isomer and aqueous sulfuric acid of not more than about 20% strength.

9. A process for the conversion of an olefine alcohol possessing an olefinic grouping directly linked to a carbinol group containing at least one hydrogen atom into its saturated isomer which comprises heating a substantially homogeneous aqueous liquid system comprising a primary olefine alcohol of the above type and an acid catalyst at such a pressure that molecular rearrangement of said alcohol to an isomeric saturated aldehyde takes place.

10. A process for the conversion of an olefine alcohol possessing an olefinic grouping directly linked to a carbinol group containing at least one hydrogen atom into its saturated isomer which comprises heating a substantially homogeneous liquid system comprising a secondary olefine alcohol of the above type and an acid catalyst at such a pressure that molecular rearrangement of said alcohol to an isomeric saturated ketone takes place.

11. A process for the conversion of isobutenol to isobutyraldehyde which comprises heating a substantially homogeneous aqueous liquid system comprising isobutenol and a mineral acid catalyst.

12. A process for the conversion of isobutenol to isobutyraldehyde which comprises heating a substantially homogeneous aqueous liquid system comprising isobutenol and aqueous sulfuric acid of not more than about 20% strength.

13. A process for the conversion of an olefine alcohol into its saturated isomer which comprises heating an organic hydroxy compound comprising an ethylene group which contains a tertiary carbon atom and is directly linked to a carbinol group which contains at least one hydrogen atom under superatmospheric pressure in the presence of an acid catalyst in a homogeneous liquid system.

14. A process for the conversion of an olefine alcohol into its saturated isomer which comprises heating an organic hydroxy compound comprising an ethylene group which contains a tertiary carbon atom and is directly linked to a carbinol group which contains at least one hydrogen atom under superatmospheric pressure in the presence of a mineral acid catalyst in a homogeneous liquid system.

15. A process for the conversion of an olefine alcohol into its saturated isomer which comprises heating an organic hydroxy compound comprising an ethylene group which contains a tertiary carbon atom and is directly linked to a carbinol group which contains at least one hydrogen atom under superatmospheric pressure and in the presence of aqueous sulfuric acid of not more than about 20% strength in a homogeneous liquid system.

16. A process for the conversion of an olefine alcohol into its saturated isomer which comprises heating an organic hydroxy compound comprising an ethylene group which contains a tertiary carbon atom and is directly linked to a carbinol group which contains at least one hydrogen atom in a substantially homogeneous aqueous liquid system with an acid catalyst.

17. A process for the conversion of an unsaturated alcohol possessing an olefinic grouping directly linked to a carbinol group containing at least one hydrogen atom to a carbonylic compound which comprises heating said unsaturated alcohol with an acid acting catalyst in a substantially homogeneous aqueous liquid system.

18. A process for the conversion of an unsaturated alcohol possessing an olefinic grouping directly linked to a carbinol group containing at least one hydrogen atom to a carbonylic compound which comprises heating said unsaturated alcohol with an acid acting catalyst in a homogeneous liquid system at superatmospheric pressure.

19. A process for the conversion of an unsaturated alcohol possessing an olefinic grouping directly linked to a carbinol group containing at least one hydrogen atom to a carbonylic compound which comprises heating said unsaturated alcohol with an acid acting catalyst in an aqueous homogeneous liquid system at superatmospheric pressure.

20. A process for the conversion of an unsaturated alcohol possessing an olefinic grouping directly linked to a carbinol group containing at least one hydrogen atom to a carbonylic compound which comprises heating said unsaturated alcohol with an acid acting catalyst in an aqueous homogeneous liquid system.

21. A process for the conversion of an unsaturated alcohol to a carbonylic compound which comprises heating an unsaturated alcohol containing the grouping

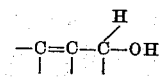

with an acid acting catalyst in a substantially homogeneous aqueous liquid system.

22. A process for the conversion of an unsaturated alcohol to a carbonylic compound which comprises heating an unsaturated iso alcohol containing the grouping

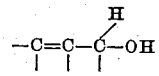

with an acid acting catalyst in a homogeneous liquid system under superatmospheric pressure.

HERBERT PETER AUGUSTUS GROLL.
MIROSLAV W. TAMELE.